March 11, 1958     LA MAR S. WILLIAMS     2,826,340
COMBINATION SALT AND PEPPER SHAKER
Filed Sept. 4, 1956
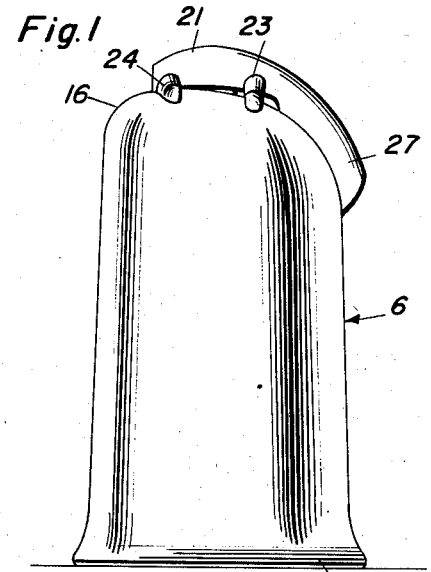
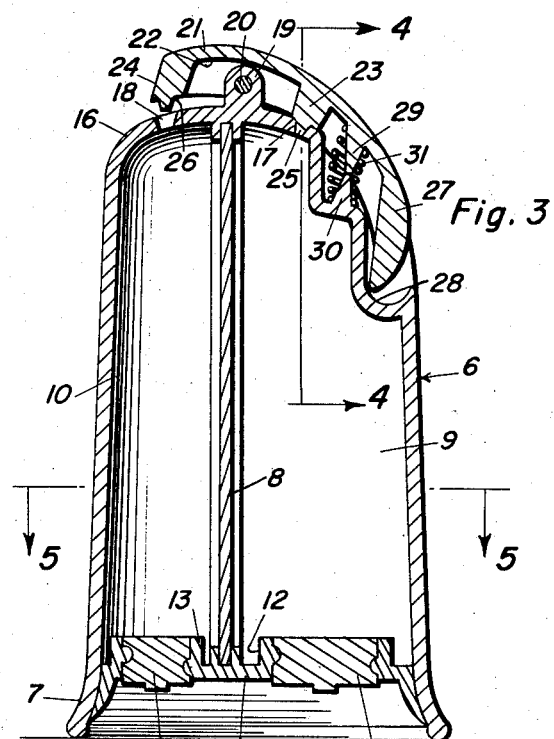
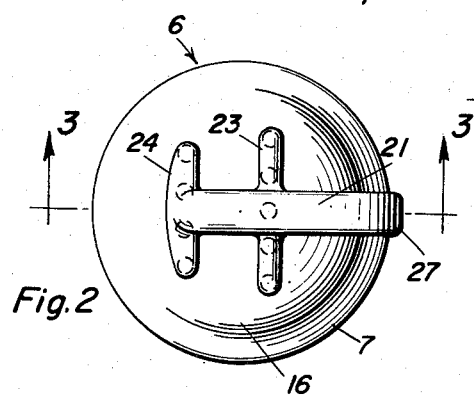
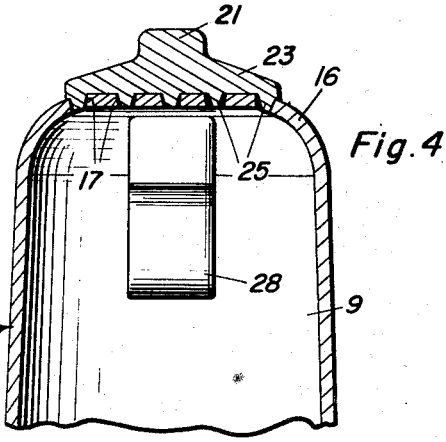
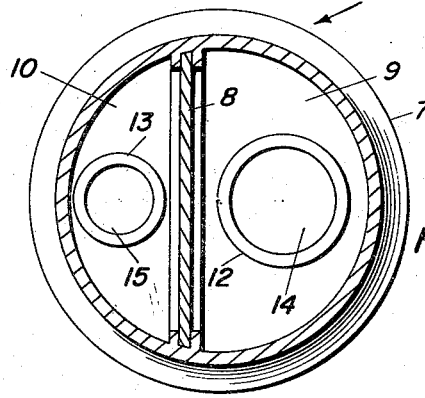
LaMar S. Williams
INVENTOR.

United States Patent Office 2,826,340
Patented Mar. 11, 1958

2,826,340

COMBINATION SALT AND PEPPER SHAKER

La Mar S. Williams, Salt Lake City, Utah

Application September 4, 1956, Serial No. 607,767

2 Claims. (Cl. 222—142.6)

This invention pertains to salt and pepper shakers and has for its primary object to provide a combination device of this character which includes unique means for selectively controlling the discharge of the salt or pepper.

Another important object of the present invention is to provide, in a manner as hereinafter set forth, a combination condiment holder of the character set forth which is self-clearing, thus ensuring the free flow of the salt or pepper under substantially all conditions when the device is in use.

Other objects of the invention are to provide a combined salt and pepper shaker of the aforementioned character which will be relatively simple in construction, durable, compact, of light weight, attractive in appearance and which may be produced at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view in side elevation of a combination salt and pepper shaker embodying the present invention;

Figure 2 is a top plan view thereof;

Figure 3 is a view in vertical section through the device, taken substantially on the line 3—3 of Figure 2;

Figure 4 is a vertical sectional view through the upper portion of the device, taken substantially on the line 4—4 of Figure 3; and Figure 5 is a horizontal sectional view, taken substantially on the line 5—5 of Figure 3.

The embodiment of the invention which has been illustrated comprises a circular container 6 of suitable capacity and material. The container 6 includes a flared, beaded lower end or base portion 7. Mounted vertically in the container 6 is a partition 8 defining relatively large and small salt and pepper compartments 9 and 10, respectively. The container 6 further includes an elevated bottom 11 formed to provide threaded filling openings 12 and 13 for the compartments 9 and 10. Screw plugs 14 and 15 close the openings 12 and 13.

The container 6 still further comprises a substantially rounded top portion 16 having formed therein on opposite sides of the partition 8 series or rows of substantially conical discharge perforations or openings 17 and 18 communicating with the compartments 9 and 10, respectively. The openings 17 and 18 may be of any suitable size and any desired number of said openings may be provided.

Rising from the top 16 of the container 6 is an apertured ear or lug 19 which, it will be observed, is located intermediate the rows of openings 17 and 18. Pivotally mounted, at an intermediate point on the ear 19, as at 20, is an arcuate rockable thumb lever 21. The lever 21 is recessed, as at 22, to accommodate the ear 19. Formed integrally with the lever 21, on opposite sides of the pivot 20, are transverse bars 23 and 24. Formed integrally beneath the bars 23 and 24 are substantially conical valves 25 and 26 adapted to seat, respectively, in the openings 17 and 18 for clearing and closing said openings.

The lever 21 still further includes, on one end, an operating handle or thumb piece 27 for manually actuating said lever in a direction to close the salt discharge openings 17. This is shown to advantage in Figure 3 of the drawing. The upper portion of the container 6 is recessed, as indicated at 28, to accommodate this end portion of the lever 21. A pair of opposed, coacting stops 29 and 30 on the lever 21 and the container 6 limit the travel of said lever under manual actuation. A coil spring 31 is mounted under tension on the stops 29 and 30 for actuating the lever 21 in a direction to close the pepper discharge openings 18.

To use the shaker, the plugs 14 and 15 are of course removed to permit the compartments 9 and 10 to be filled with salt and pepper. The openings 17, in the embodiment shown, are normally open and to dispense the salt in the compartment 9 it is only necessary to invert and shake the container 6. To dispense the pepper in the compartment 10 the rockable lever 21 is manually actuated against the tension of the coil spring 31 for opening the openings 18 and simultaneously closing the openings 17. The valves 25 and 26 seating in the openings 17 and 18 when the device is in use prevent said openings from becoming clogged in an obvious manner, thus ensuring the free discharge of the condiments.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combination salt and pepper shaker of the character described comprising: a substantially circular container including a vertical partition defining relatively large and small compartments for the reception, respectively, of salt and pepper, said container further including a substantially rounded top having rows of substantially conical salt and pepper discharge openings therein on opposite sides of the partition communicating with the respective compartments, a lever pivotally mounted at an intermediate point on the container top between the rows of discharge openings, transverse bars on said lever on opposite sides of the pivotal axis thereof, substantially conical valves depending from said bars and engageable in the openings for closing and clearing same, a coil spring mounted on the container and engaged with one end portion of the lever for yieldingly actuating same in a direction to close the pepper openings, and a finger piece on said one end of said lever for manually actuating same against the tension of said coil spring for closing the salt discharge openings.

2. A combination salt and pepper shaker comprising a container including a vertical partition dividing the container into a pair of compartments for receiving salt and pepper respectively, said container having a top provided with rows of discharge openings therein on opposite sides of the partition communicating with the respective compartments to discharge salt and pepper therefrom, a lever extending across said top in the center thereof and pivotally mounted intermediate its ends on said top between the rows of openings, for rocking in opposite directions, respectively, transverse bars on said lever having substantially conical valves depending therefrom for closing and clearing said salt and pepper discharge openings upon rocking of the lever in opposite directions, and a coil spring interposed between said top and said lever at one side of the pivot of the lever for rocking the lever in a direction to close the pepper discharge openings, said lever being manually rockable in the opposite direction to close the salt discharge openings and open the pepper discharge openings.

References Cited in the file of this patent

UNITED STATES PATENTS

| | | |
|---|---|---|
| 843,356 | Parker | Feb. 5, 1907 |
| 1,139,841 | Bright | May 18, 1915 |
| 2,021,049 | Currie | Nov. 12, 1935 |

FOREIGN PATENTS

| | | |
|---|---|---|
| 844,981 | France | Aug. 7, 1939 |